(No Model.)  J. CARR.  3 Sheets—Sheet 1.
ROTARY FAN.
No. 339,853.  Patented Apr. 13, 1886.
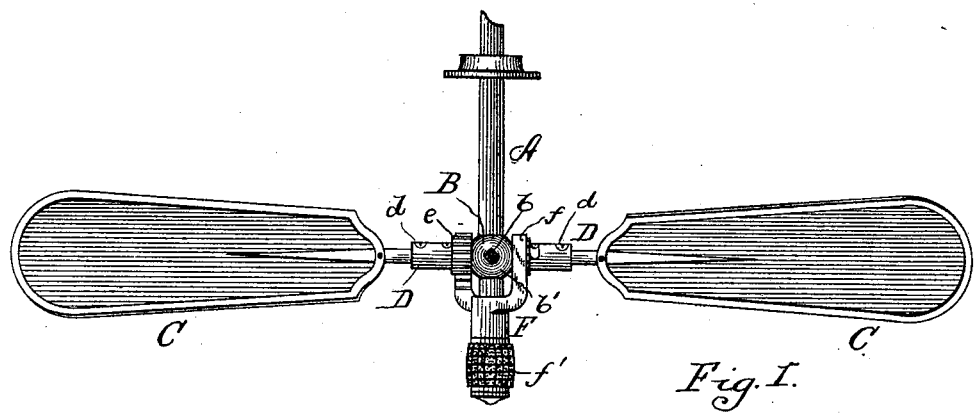
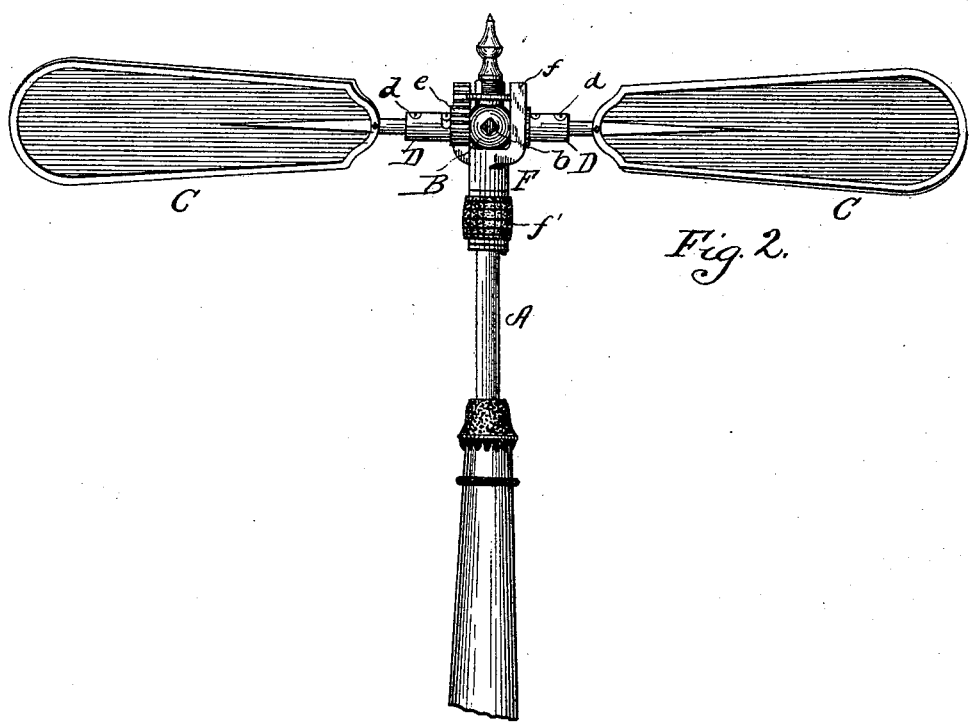
WITNESSES:
Chas Bingham
E. E. Hawes
INVENTOR,
Jos. Carr,
By S. J. Van Stavoren
ATTORNEY (No Model.) 3 Sheets—Sheet 2.

J. CARR.
ROTARY FAN.

No. 339,853. Patented Apr. 13, 1886.

WITNESSES:
Chas. Bingham
E. E. Howes

INVENTOR,
Jos. Carr
By S. J. Van Stavoren
ATTORNEY (No Model.)　　　　　　　　J. CARR.　　　　　3 Sheets—Sheet 3.
ROTARY FAN.

No. 339,853.　　　　　　　Patented Apr. 13, 1886.

WITNESSES:　　　　　　　　　　　　INVENTOR
Chas. Bingham　　　　　　　　　　　Jos. Carr
E. E. Howes　　　　　　　　　　By S. J. Van Stavoren
　　　　　　　　　　　　　　　　　　ATTORNEY

UNITED STATES PATENT OFFICE.

JOSEPH CARR, OF PHILADELPHIA, PENNSYLVANIA.

ROTARY FAN.

SPECIFICATION forming part of Letters Patent No. 339,853, dated April 13, 1886.

Application filed February 23, 1886. Serial No. 192,852. (No model.)

*To all whom it may concern:*

Be it known that I, JOSEPH CARR, a citizen of the United States, residing at Philadelphia, in the county of Philadelphia and State of Pennsylvania, have invented certain new and useful Improvements in Rotary Fans, of which the following is a specification, reference being had therein to the accompanying drawings, wherein—

Figure 3:
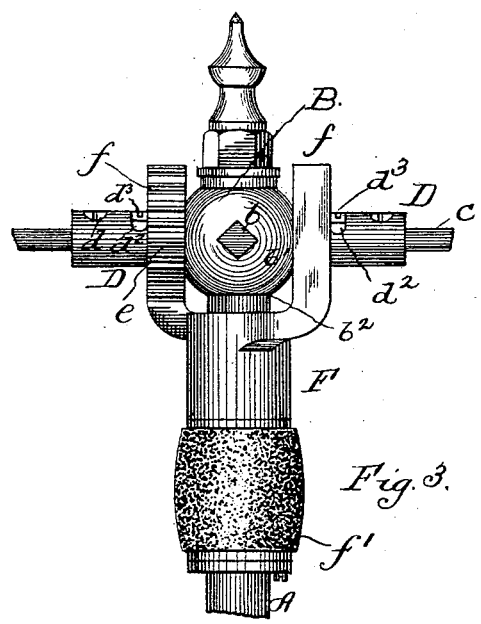
Figure 4:
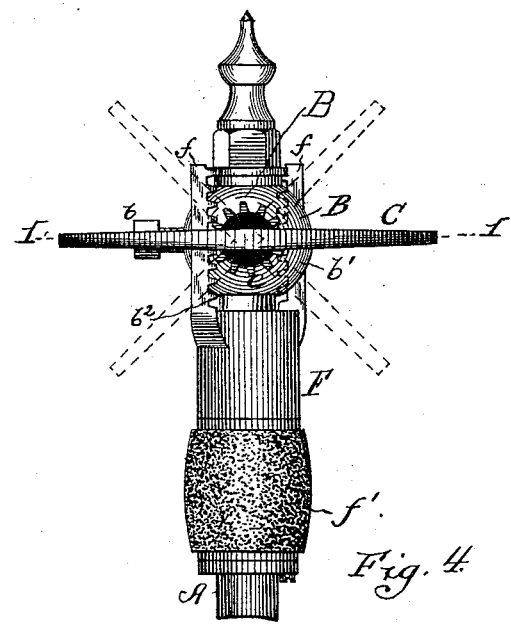
Figure 5:
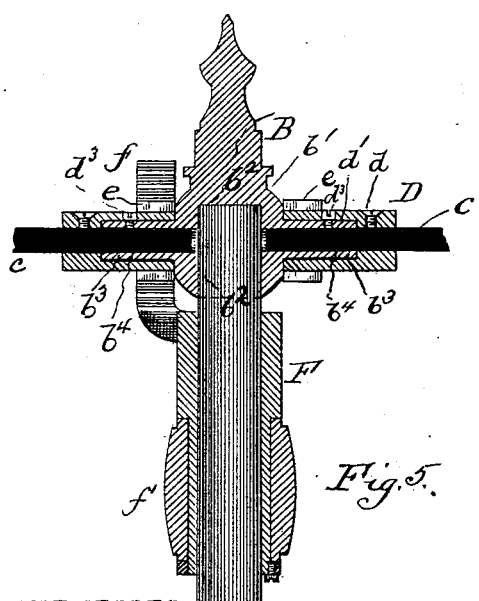
Figure 6:
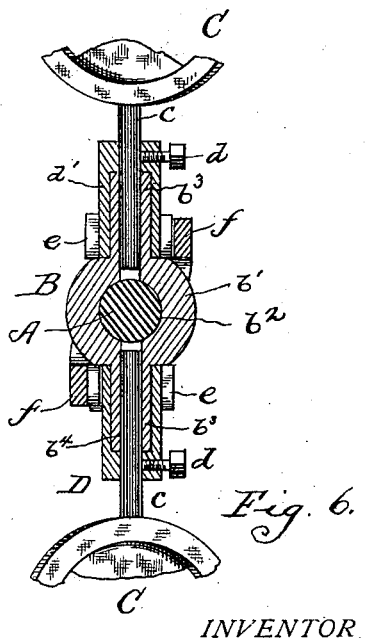
Figure 7:
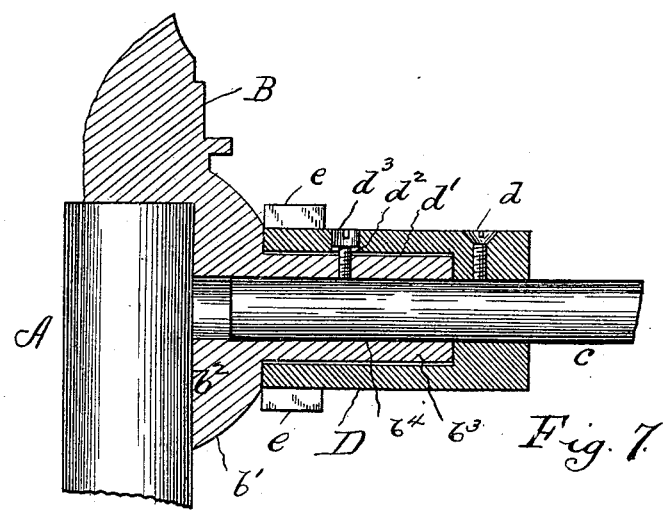
Figure 8:
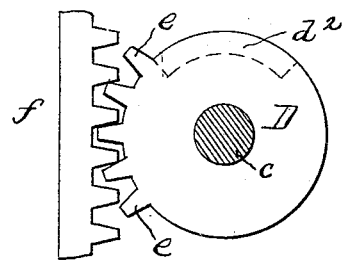

Figure 1 is an elevation of a rotary fan and part of a shaft adapted to depend from the ceiling, and showing the blades or wings adjusted to throw the air upwardly toward the ceiling or to produce an ascending draft. Fig. 2 is an elevation of a rotary fan and part of driving-shaft adapted to a pillar, column, or post, and showing blades or wings adjusted to throw the air downwardly or to produce a descending circulation of air. Fig. 3 is an enlarged elevation showing portion of fan-blade or wing-shafts, bearings therefor, part of driving-shaft, and rack-and-pinion mechanism for rotating the blades or wings upon their axes to alter their inclination. Fig. 4 is an end elevation of same, showing blades or wings adjusted to a horizontal position or to that for stopping agitation of the air while the fan is still rotating. Fig. 5 is a vertical section of Fig. 3. Fig. 6 is a section on line 1 1, Fig. 4. Fig. 7 is an enlarged sectional view showing part of driving-shaft, wing or blade holder, indicating slight play between the holder and the sleeve attached to the blade or wing shaft to reduce friction between the holder and the sleeve, so that the blades or wings may be easily rotated on their axes to vary the inclination of same; and Fig. 8 is an end view of said sleeve, showing segmental instead of pinion gear and part of one of the racks on hand-piece for the blade or wing adjusting mechanism.

My invention has relation to rotary fans which are used to produce a draft or agitation of the air in factories, dry-goods houses, offices, restaurants, and other places, having particular reference to that class of said fans which are provided with a hand-piece and mechanism between it and the fan blades or wing for rotating them upon their axes without stopping the rotation of the fan or changing its speed, whereby the amount of draft or atmospheric disturbance is regulated as desired, and either an upward or a downward draft or agitation is provided, or no draft in either direction is effected.

My invention has for its object to provide a simple, durable, and easily-operated adjusting mechanism for rotating the fan blades or wings on their axes for adjusting their inclination to their path of travel while the fan is in motion, which mechanism is adapted to a ceiling, side wall, angularly arranged, and post, column, or pillar rotary fans, and which admits of placing the axis or shaft of each blade or wing in alignment with one another, and further admits of the blades or wings holding themselves in their adjusted position by means of friction between the parts of the adjusting mechanism without necessitating the use of independent frictional or other like devices.

My invention accordingly consists of the combination, construction, and arrangement of parts, as hereinafter described and claimed, having reference particularly to a wing or blade holder, a socket-sleeve secured to the axis of each blade or wing and having peripheral geer-teeth at one end and a bearing on the wing-holder, and to a hand-piece adapted to slide up and down on the driving-shaft and having upon opposite sides of said shaft upwardly-projecting, diagonally-placed, and reversely-arranged racks which engage with the gear-teeth of said sockets, whereby as said hand-piece is raised or lowered the racks thereon rotate the blades or wings on their axes and vary the inclination of the same.

In the drawings, A represents the driving-shaft for a rotary fan, which may depend from a ceiling, as illustrated in Fig. 1, or pass up through a post or column, as illustrated in Fig. 2, or be otherwise arranged, as desired.

To shaft A is secured, by means of a set-screw, $b$, a wing or blade holder, B, which consists of a central body or piece, $b'$, having an opening, $b^2$, for passage or reception of shaft A. Upon each side of the center piece, $b'$, and projecting therefrom, are tubular wrist-pins $b^3$, in the bore $b^4$ of which snugly fit the shafts $c$ of fan blades or wings C. These wrist-pins A, it will be noticed, (see more plainly in Fig. 6,) are in line with each other, and are located upon opposite sides of holder B; hence the blade or wing shafts align, as illustrated.

To each of the latter is removably secured a socket-sleeve, D, by means of a set-screw, $d$. The socket or enlarged bore $d'$ of sleeves D loosely fit upon the wrist-pins $b^3$ of holder B, so as to have more or less play thereon, for a purpose hereinafter set forth. Upon the periphery or outside surface of sleeves D, and at their ends next to center piece, $b'$, of holder B, are formed teeth $e$, which may be continued around the sleeves D, to provide a gear-wheel for said sleeves, or continued part way around the same to form a segmental gear, as shown in Fig. 8. These gears engage with upwardly-projecting racks $f$ on a tubular hand-piece, F, loose on shaft A. Hand-piece F has a loose or swiveled collar, $f'$, connected thereto in any suitable manner, to be taken hold of in raising or lowering the hand-piece, as hereinafter described, while it is revolving with the shaft A. The sleeves D are provided with transverse slots $d^2$, through which pass pins $d^3$, engaging with wrist-studs $b^3$, to limit the rotation of said sleeves D. The racks $f$, it will be noted, are upon opposite sides of the axial line of the wing-shafts $c$, or are diagonally placed and reversely arranged on hand-piece F, so as to rotate sleeves D, and consequently the wing or blades of the fan in opposite directions, to cause them to present the same inclination to the plane of their travel or rotation. The wing or blade holder B, it will be observed, is secured to shaft A, and the hand-piece F, though loose upon said shaft, is suspended from the gear-teeth $e$ on sleeves D by the engagement of the racks $f$ therewith, said engagement being maintained by the limit of axial rotation of sleeves D through the medium of their slots $d^2$ and stop-pins $d^3$; hence as the holder B and blades revolve, the hand-piece F also revolves with shaft A.

The operation of the foregoing is as follows: When the hand-piece F is in the position shown in Figs. 3 and 4, the racks $f$ are in the middle of their to and fro or up and down movement, and the fan-blades are then horizontal or parallel with the plane of their travel, and do not then agitate the air to produce appreciable draft or atmospheric disturbance. When, however, the racks are moved upwardly to their full limit, as shown in Fig. 2, the wings or blades are axially rotated in one direction to their full limit, and are then in the position shown in Fig. 2, or at greatest inclination, to produce a descending draft or a downward agitation of air of the greatest possible volume. By adjusting the blades to any angular position from that last described to a horizontal position, the volume of the downward draft, or extent of downward agitation, is regulated as desired. When the hand-piece and racks $f$ are drawn down to their full limit, as shown in Fig. 1, the inclination of the blades is such, or is the reverse of that indicated in Fig. 2, as to produce the greatest amount of ascending draft or upward agitation of air, which may be more or less reduced, as desired, by raising the racks or hand-piece to alter the inclination of the blades from the position indicated in Fig. 1 to a horizontal one. These various movements are effected while the fan is rotating by simply taking hold of hand-piece, collar, or sleeve $f'$, which, being loose or swiveled on the hand-piece, permits of pushing it up and down while it is rotating with shaft A.

The play or loose joint between the sleeves D and the wrist-pins $b^3$ serves the double purpose, first, of reducing the friction between said parts, so that less pressure is required to raise and lower the hand-piece to effect an axial rotation of the fan-blades or wings for varying their inclination, and, second, to effect a slight lateral strain or movement of the gear ends of sleeves D, due to pressure of blades or wings against the air, for producing friction between said gear-teeth and racks $f$, to hold the blades or wings in their adjusted or inclined positions without necessitating the employment of extraneous or independent frictional devices.

What I claim is—

1. A rotary fan having driving-shaft and axially-rotating fan-blade shafts, combined with a loose hand-piece surrounding or inclosing the driving-shaft and sliding up and down thereon, and in gear with and supported by the blade-shafts, as and for the purpose set forth.

2. A rotary fan and its driving-shaft, combined with a loose hand-piece surrounding the driving-shaft and suspended from the blade-shafts of the fan by a gear-connection, as and for the purpose set forth.

3. A rotary fan having a driving-shaft, aligning fan-blade shafts having gear-teeth, a hand-piece sliding up and down upon and surrounding the driving-shaft, and having racks engaging with said gear-teeth, and a swiveled collar for the hand-piece, substantially as and for the purpose set forth.

4. In a rotary fan, the combination of a driving-shaft, a wing or blade holder having lateral tubular wrist-pins, blades or wings having shafts adapted to the bore of the wrist-pins, and tubular sleeves with gear-teeth fitting upon the outside of said pins, stop mechanism for limiting the axial rotation of the blade-shafts, a loose sleeve surrounding the driving-shaft, and racks connected to the sleeve and in gear with the teeth upon the blade-shaft sleeves, as and for the purpose set forth.

5. The combination of driving-shaft A, holder B, having wrist-pins $b^3$, blade or wing shafts C, having socket-sleeves D, with loose play between them and said wrist-pins, and having teeth $e$, the hand-piece F, surrounding shaft A and having upwardly-projecting and diagonally-arranged racks $f$, for engagement with gear $e$, as set forth.

6. In a rotary fan, the combination of driving-shaft A, holder B, having tubular wrist-pins $b^3$, blade or wing shafts C, having socket-sleeves D, adapted to wrist-pins $b^3$, and having gear-teeth $e$, slot $d^2$, and stop $d^3$, and the hand-piece F, having diagonally-arranged racks $f$, for engagement with gears $e$, as set forth.

In testimony whereof I affix my signature in presence of two witnesses.

JOSEPH CARR.

Witnesses:
S. J. VAN STAVOREN,
CHAS. F. VAN HORN.